United States Patent [19]

Mustoe et al.

[11] 3,874,680

[45] Apr. 1, 1975

[54] SEAL RING AND BEARING ASSEMBLY

[75] Inventors: David L. Mustoe, Wheatridge, Colo.; Frederic D. Selbie, III, Signal Mountain, Tenn.; Michael J. Fenerty, Boulder, Colo.

[73] Assignee: Coors Porcelain Company, Golden, Colo.

[22] Filed: Aug. 23, 1973

[21] Appl. No.: 390,809

[52] U.S. Cl. ................................................. 277/96
[51] Int. Cl. ............................................. F16j 15/34
[58] Field of Search ............ 58/140, 140 A; 106/62; 277/96 R, 96 A, 237, 224

[56] References Cited
UNITED STATES PATENTS

| | | |
|---|---|---|
| 1,549,651 | 8/1925 | Codding ........................... 58/140 R |
| 3,199,795 | 8/1965 | Bennett et al. .................... 277/96 R |
| 3,544,266 | 12/1970 | Palmour et al. ..................... 106/62 |
| 3,770,181 | 11/1973 | Stahl ................................. 277/96 R |

Primary Examiner—Robert I. Smith
Attorney, Agent, or Firm—Reising, Ethington & Perry

[57] ABSTRACT

A housing with a rotary shaft extending therethrough is provided with a face type seal in the form of two abutting relatively rotating ceramic rings, the composition of at least one of which is magnesia-alumina spinel.

12 Claims, 2 Drawing Figures

SEAL RING AND BEARING ASSEMBLY

BACKGROUND AND SUMMARY OF THE INVENTION

This invention relates to bearing and sealing assemblies for relatively rotatable members. It has particular utility as a face type seal assembly for preventing leakage of fluid along a rotating shaft where it extends through the wall of a housing, and hence will be described in conjunction therewith.

A typical application of the invention as a face seal assembly for rotary shafts is in automotive engine water pumps wherein sealing against water leakage is effected by two abutting ring members encircling the shaft, one of the rings being rotatably driven by the shaft and the other held stationary in the pump housing. Various materials have heretofore been used for the rings, for example metals, carbon, organic resins and alumina ceramic. The difficulty, however, has always been that where a hard wear-resistant material like alumina ceramic is used there is a friction problem and where a softer material such as organic resin is used there is a wear problem. Of course, when there is a friction problem then there is serious disadvantage not only because of the loss in mechanical efficiency but also because the friction itself increases the wear and hazard of other damage to the rings because of the heat generated.

It is known to use an assembly wherein one of the rings is of hard and wear-resistant alumina ceramic and the other ring is of a relatively soft material such as carbon or organic resin so as to reduce friction. However, this is not a full solution since there remains the wear problem as regards the relatively soft ring. What is really required to solve the problem is an assembly wherein both rings can be of a hard wear-resistant material and yet without there being a friction problem. The present invention fulfills this need.

It is, therefore, a principal object of the invention to provide a face type seal for rotary shafts which not only has low friction drag characteristics, but which also has high resistance to wear.

A more specific object of the invention is to provide such a face type seal in which both the rotating and stationary seal rings are of hard wear-resistant material, with the material of at least one of the rings being sintered magnesia-alumina spinel.

A preferred embodiment of the invention will now be described, having reference to the drawings, wherein.

Figure 1:
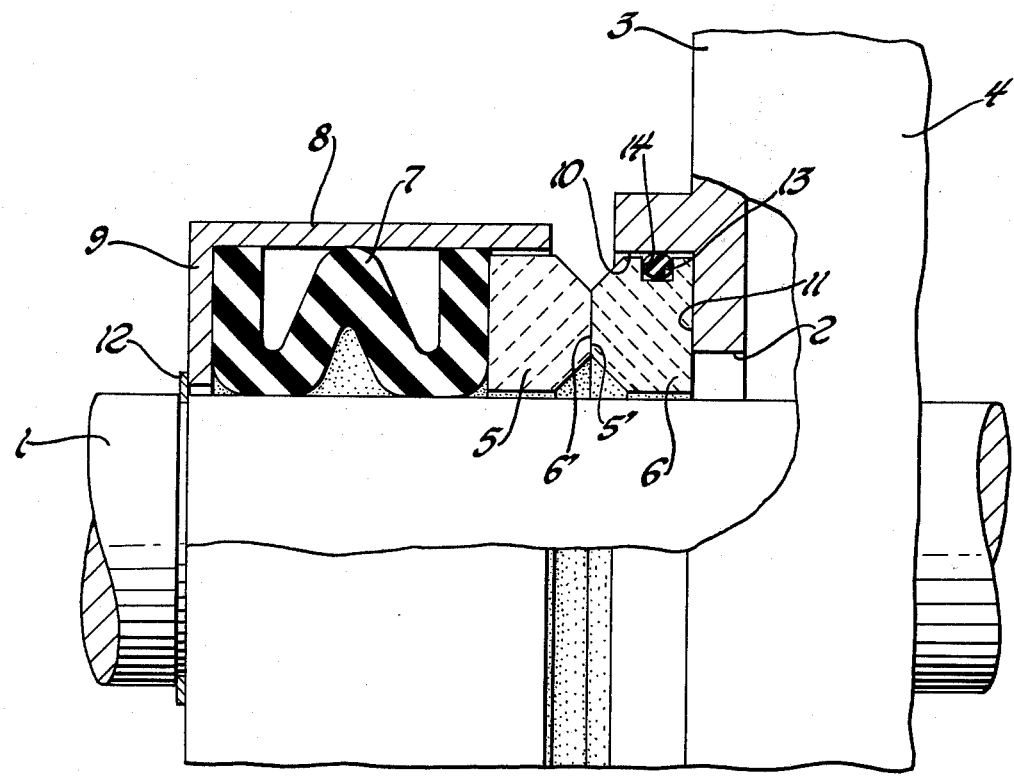
FIG. 1 is a longitudinal sectional view through a portion of an automotive engine water pump showing the invention in the form of a face type seal installed between the rotary shaft of the pump and an end wall of the pump housing.
Figure 2:
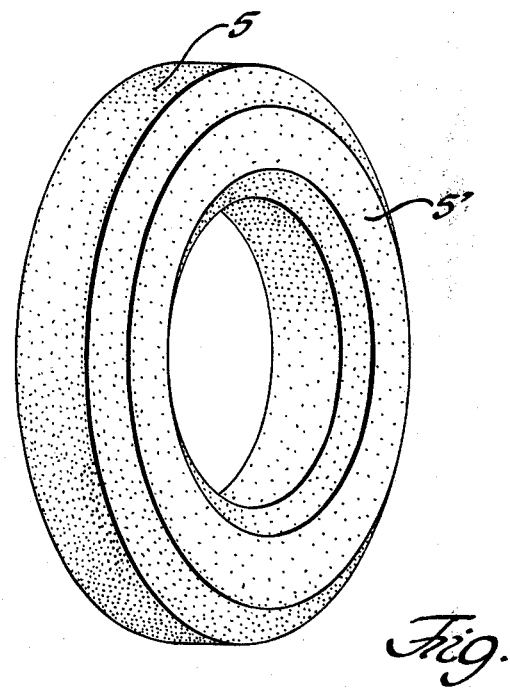
FIG. 2 is a perspective view of one of the ceramic rings of the face type seal shown in FIG. 1.

Referring now in detail to the drawing, and first to FIG. 1, a portion of an automotive engine water pump is shown including a rotatively driven shaft 1 extending through an opening 2 in an end wall 3 of the housing 4 of the pump. For preventing leakage of water through the opening 2 along the rotating shaft 1 there is provided a face type seal in the form of two axially adjacent abutting rings 4 and 6, the latter of which remains stationary with the housing and the former, 5, of which rotates the shaft and hence in relatively rotatable sliding engagement with the stationary ring 6. The close mating engagement of the abutting end faces 5' and 6' of these rings operates to block passage of water between them.

Since the two rings encircle the shaft with slight clearance about the latter, some provisions must also be made to block escape of water through the rings and along the shaft. In the case of the ring 5 such supplementary sealing is provided by a neoprene or other rubber-like material member 7, shown for illustrative purposes in the form of a W-shaped section ring which also encircles the shaft and grip the latter behind the ring 5. The ring 5 and the secondary seal ring 7 are enclosed in a retainer 8 of metal or other rigid material having an end wall 9 which is suitably located in fixed axially spaced relationship to the face seal ring 5, as by a snap ring 12 seated in an annular groove provided therefore in the shaft 1. The rubber-like secondary seal ring 7, being compressed somewhat axially between the retainer end wall 9 and the face seal ring 5, serves to maintain the ring 5 in abutting engagement with the other face seal ring 7, and the latter in abutment with the end wall 3 of the pump housing.

Also, as illustrated, the ring 7 may be recessed in a counterbore 10 adjacent the opening 2 in the housing so that under pressure of the resilient ring 7 the face seal ring 6 is seated in abutment with the bottom wall 11 of the counterbore. The abutting engagement between the ring 6 and the bottom wall 11 of the counterbore serves to frictionally restrain rotation of the ring 6. Supplementing this frictional restraint against rotation of the ring 6, and also to seal against leakage between the ring 6 and the housing, is an O-type ring 13 which is interposed between the ring 6 and the counterbore 10. As shown, this O-ring is disposed in an annular groove 14 formed in the outer periphery of the ring 6, the diameter of the O-ring 13 in radial section being sufficient that it is compressed somewhat between the counterbore 10 and the bottom of the groove 14.

Though the particular structure shown for mounting the seal rings 5 and 6 has been described in some detail, it will be understood that such structural details and also the particular shapes of the seal rings shown are merely illustrative, the instant invention residing not in the particular shape of the rings or in the details of the structure for mounting them but, rather, in the composition and characteristics of the rings.

In accordance with the invention, at least the abutting radially extending faces 5' and 6' of the rings 5 and 6, and preferably both rings in their entirety, are of a material having a hardness of at least 7 on the Mohs scale, and the abutting face of at least one of the rings, and preferably at least one of the rings in its entirety, is of sintered magnesia-alumina spinel ($MgO \cdot Al_2O_3$). In the most preferred embodiment, both rings are in their entirety of sintered magnesia-alumina spinel. The great advantage of sintered magnesia-alumina spinel is that it not only has high hardness (i.e., about 8 to 9 on the Mohs scale) and hence wear resistance along with good mechanical strength and heat and corrosion resistance, but it additionally has good low friction characteristics.

Magnesia-alumina spinel occurs in nature and can also be synthesized. As well known in the art, it can be manufactured by mixing together, in equi-molar portions, magnesium oxide and alumina oxide in powder form, and then heating the mixture to about 1200°C whereupon there is reaction between the two oxides to form the spinel. In making the spinel for the practice of the present invention it is preferred that substantial overages of either magnesium oxide or aluminum oxide be avoided in preparing the mix; however, the body, or at least the facing of the body, used as the seal ring should consist essentially of magnesia-alumina spinel thereby to have the desired low friction characteristics.

To manufacture the rings, magnesia-alumina spinel in powder form, preferably of a particle size of about 5 microns or less, is thoroughly mixed, as by ball milling, with a suitable organic binder, in an amount of about 2% by weight of the total batch, and then this uniform mixture of powdered spinel and the organic binder is dry pressed in suitable matched metal dies to thereby form the rings. The rings, so formed, are then fired to a temperature of about 1400°C to 1700°C, typically 1650°C with a hold at that temperature for one hour, whereupon the organic binder is vaporized or burned out and the spinel sinters to a dense, hard monolithic body. Dextrine or any of various organic waxes or resins may be used as the binder, as well known in the ceramic manufacturing art.

After the firing operation the surfaces of the rings which are to be in abutting contact can then be polished to provide a smooth surface. It is desirable that the surfaces which are to be in abutting contact have a surface finish not greater (i.e. rougher) than about 30 microinches, (root mean square). It should be pointed out, however, that while smooth surface finish is desirable in that it contributes to the low friction characteristics, smooth surface finish is not the explanation as to why magnesia-alumina spinel has such excellent low friction characteristics, or relative lubricity, as compared with other hard materials such as alumina ceramic. That is, if sintered aluminum oxide ceramic bodies, or ceramic bodies of comparable hardness such as sintered zirconium oxide, are polished to extreme smoothness they nevertheless have high friction drag and hence are not comparable to sintered magnnesia-alumina spinel as regards low friction characteristics.

The sintered magnesia-alumina spinel rings should preferably have a density of at least about 3.4 in order to provide optimum strength characteristics. If desired, the rings can have a backing of another material, for example alumina ceramic, and with only the facing being of the magnesia-alumina spinel though there is no advantage to this except as it might provide some slight cost saving.

As has been indicated, it is preferred that both of the abutting rings be of the sintered magnesia-alumina spinel. However, if desired one of the rings can be of a material other than magnesia-alumina spinel though in all instances it is much preferred that where one of the rings is to be formed of another material, it be of a material having a hardness of at least about 7 on the Mohs scale. For most applications of the invention the only advantage to using only one ring of the sintered magnesia-alumina spinel and the other ring of some other hard material would be one of the cost savings. That is, because at this time magnesia-alumina spinel is not produced and marketed in the mass quantities such as is true, for example of aluminum oxide, the magnesia-alumina spinel is somewhat more expensive.

Where it is desired to use some other material for one of the rings, the preferred material is sintered alumina ceramic. Such ceramics are well known in the art, and as indicated previously, have heretofore been ued extensively as seal rings. Examples of alumina ceramics are disclosed in U.S. Pat. Nos. 2,272,618 and 3,377,176. The latter teaches and claims an alumina ceramic having a very high aluminum oxide content and containing substantially no silica. Where one of the rings used in the practice of the present invention is to be of alumina ceramic it is preferred that it contain at least about 95% by weight aluminum oxide and substantially no silica.

It will be understood that while the invention has been described in detail specifically with respect to a particular embodiment thereof, various changes and modifications may be made all within the full and intended scope of the claims which follow.

The embodiments of the invention in which an exclusive property or privilege is claimed are defined as follows:

1. A seal assembly comprising two ring members having radially extending surfaces in sliding contact with each other, both of said surfaces having a hardness on the Mohs scale of at least about 7 and at least one of said surfaces being of magnesia-alumina spinel.

2. An assembly as set forth in claim 1, wherein both of said surfaces are of magnesia-alumina spinel.

3. An assembly as set forth in claim 1, wherein one of said surfaces is of alumina ceramic.

4. An assembly as set forth in claim 1, wherein each of said two members is a monolithic body of sintered magnesia-alumina spinel.

5. An assembly as set forth in claim 1, wherein one of said members is a monolithic body of sintered magnesia-alumina spinel and the other of said members is a body of alumina ceramic.

6. An assembly as set forth in claim 5, wherein said body of alumina ceramic contains at least about 95% by weight aluminum oxide.

7. An assembly as set forth in claim 1, wherein each of said surfaces has a surface finish not greater than 30 microinches (root mean square).

8. An assembly comprising a rotating shaft, a housing having an opening therethrough encircling the shaft, and a face type seal for preventing leakage of fluid between said shaft and housing opening, said seal comprising two axially adjacent rings encircling the shaft adjacent said opening, each of said rings having an annular end face, each said face rotatably bearing against the face of the other ring, one of said rings being connected to the shaft for rotation therewith and the other of said rings being held against rotation by the housing, the face of each of said rings having a hardness on the Mohs scale of at least about 7 and the face of at least one of said rings being of magnesia-alumina spinel.

9. An assembly as set forth in claim 8, wherein each of said rings is a monolithic body of sintered magnesia-alumina spinel.

10. An assembly as set forth in claim 8, wherein one of said rings is a body of alumina ceramic.

11. A seal ring for use in combination with another ring to effect a face type seal, said seal ring having a radially extending face of magnesia-alumina spinel with a surface finish not greater than about 30 microinches (root mean square) for abutting rotative sliding engagement with said other ring.

12. A seal ring as set forth in claim 11, wherein said seal ring is a monolithic body of sintered magnesia-alumina spinel.

* * * * *